(12) United States Patent
Kuegler et al.

(10) Patent No.: US 8,490,191 B2
(45) Date of Patent: Jul. 16, 2013

(54) METHOD AND SYSTEM FOR INTRUSION DETECTION

(75) Inventors: Ruediger Kuegler, Baden-Baden (DE); Peer Wichmann, Bruchsal (DE); Oliver Winzenried, Karlsruhe (DE); Marcellus Buchheit, Shoreline, WA (US)

(73) Assignee: WIBU-Systems AG, Karlsruhe (DE)

( * ) Notice: Subject to any disclaimer, the term of this patent is extended or adjusted under 35 U.S.C. 154(b) by 981 days.

(21) Appl. No.: 12/306,126

(22) PCT Filed: Jun. 9, 2007

(86) PCT No.: PCT/EP2007/005115
§ 371 (c)(1),
(2), (4) Date: Jun. 3, 2009

(87) PCT Pub. No.: WO2007/147495
PCT Pub. Date: Dec. 27, 2007

(65) Prior Publication Data
US 2010/0017879 A1 Jan. 21, 2010

(30) Foreign Application Priority Data
Jun. 21, 2006 (EP) .................................. 06012776

(51) Int. Cl.
*G06F 21/00* (2006.01)

(52) U.S. Cl.
USPC ............... 726/23; 726/30; 713/156; 717/129; 717/140

(58) Field of Classification Search
USPC ................ 726/22, 23, 27; 713/156, 175, 189, 713/500
See application file for complete search history.

(56) References Cited

U.S. PATENT DOCUMENTS
4,932,054 A 6/1990 Chou et al.
6,237,137 B1 * 5/2001 Beelitz .......................... 717/129
(Continued)

FOREIGN PATENT DOCUMENTS
EP 1426850 6/2004
EP 1672554 6/2006
WO WO-9704394 2/1997

OTHER PUBLICATIONS
Govil, "Ramifications of Cyber Crime and Suggestive Preventative Measures", 2007, IEEE, pp. 610-615.*
(Continued)

*Primary Examiner* — Taghi Arani
*Assistant Examiner* — Gregory Lane
(74) *Attorney, Agent, or Firm* — Marc A. Hubbard; Hubbard Law, PLLC

(57) ABSTRACT

Method for protecting computer software by detecting an attack of an intruding program interfering with the execution of said protected software on a computer system with a processor and at least a processor memory, wherein the computer software to be protected communicates with a license container containing a license for using and executing the protected computer software and containing at least one cryptographic key, wherein the license container provides licenses and cryptographic keys for the protected software to protect its usage and its integrity, and wherein the protected computer software is at least partly encrypted and uses the associated cryptographic keys to decrypt said protected software for executing comprises the following steps: during execution of the protected software, analyzing the behavior of the protected software and/or the execution environment of the protected software on the computer system, and searching for patterns of an intrusion or an intruding program, detecting an intrusion into the protected software during the execution of the protected software, wherein the intruding program uses a monitoring component for gaining unauthorized access, and creating a signal on detection of an attack.

43 Claims, 6 Drawing Sheets

U.S. PATENT DOCUMENTS

| | | | | |
|---|---|---|---|---|
| 7,734,684 B2* | 6/2010 | Zeng et al. | .................... | 709/203 |
| 8,041,980 B2* | 10/2011 | Uehata | ................... | 713/500 |
| 2002/0116627 A1* | 8/2002 | Tarbotton et al. | ............ | 713/200 |
| 2002/0166049 A1* | 11/2002 | Sinn | ................... | 713/175 |
| 2004/0268120 A1* | 12/2004 | Mirtal et al. | .................... | 713/156 |
| 2005/0183072 A1* | 8/2005 | Horning et al. | ................ | 717/140 |
| 2005/0198510 A1* | 9/2005 | Robert et al. | .................. | 713/175 |
| 2005/0273855 A1 | 12/2005 | Oberle et al. | | |
| 2006/0090084 A1* | 4/2006 | Buer | .................... | 713/189 |
| 2006/0136708 A1* | 6/2006 | Hajji et al. | .................... | 713/2 |
| 2006/0137022 A1* | 6/2006 | Kilian-Kehr et al. | ............ | 726/27 |
| 2006/0173787 A1* | 8/2006 | Weber et al. | .................. | 705/59 |
| 2006/0185020 A1* | 8/2006 | Levy | .................... | 726/27 |
| 2006/0293029 A1* | 12/2006 | Jha et al. | .................... | 455/411 |
| 2007/0150417 A1* | 6/2007 | Hu | .................... | 705/59 |

OTHER PUBLICATIONS

International Preliminary Report on Patentability and Written Opinion for PCT/EP2007/005115, dated Dec. 22, 2008 (9 pages).

Chong, Cheun N.; Peng, Zhonghong; Hartel, Pieter H. "Secure Audit Logging with Temper-Resistant Hardware," [Online] Aug. 2002; Dept. of Computer Science, University of Twente, The Netherlands, 18 pages.

Wibu-Systems AG, CodeMeter—Outstanding Digital Rights Management, Developer's Guide, Version 2.20, Edition Jan. 2006, 290 pages.

International Search Report, Application No. PCT/EP2007/005115, Aug. 28, 2008 (6 pages).

* cited by examiner

METHOD AND SYSTEM FOR INTRUSION DETECTION

FIELD AND BACKGROUND OF THE INVENTION

The present invention refers to a method and a system for protecting computer software by detecting an attack of an intruding program interfering with the execution of said protected software on a computer system with a processor and at least a processor memory.

PRIOR ART/BACKGROUND FOR THE INVENTION

Many attack prevention system are described to protect server-client network environment to protect the server system from being accessed from outside clients. Typically there are monitoring processes at the server side analyzing the access procedure and behavior invoked by the traffic coming from outside clients directed to server. Comparison against typical behavior pattern allows or disallows the access. The application US2005273855 from Alcatel for example describes such a system where a dedicated attack prevention device, which is not described in particular in the application (and is not part of the invention of that application), holds a black-list used by an access control function to grant or withhold access to the server system. The attack prevention device is required to send commands to the access restricting functions of the server to manage the accessibility to the system.

Another prior art (Choo, U.S. Pat. No. 4,932,054) describes a filter component incorporated within a software protection hardware device which is plugged into a communications port of a computer. The device is to select bits or combinations of bits emanating from the communications port resulting from commands of a controlling software in use for protection of an application program. The filter components select the bits of a "disguised predetermined control code" matching with a reference code results in an output from the filter component used to activate functions within the protection device.

BRIEF SUMMARY

An object of the invention is to provide a method for detecting an intrusion to application software on a computer system. The method should reliably monitor such attempts of intrusion and should be very efficient.

The object is achieved by a method with the features of claim 1 and by a system with the features of claim 30. Further developments and special embodiments of the inventive method according to claim 1 are defined in the dependent sub-claims.

The method for protecting computer software according to the invention is to detect an attack of an intruding program interfering with the executing of said protected software on a computer system with a processor and at least a processor memory. The protected software includes a protected program, especially an application program, which is modified by embedding additional code. For example, the protected software can include a control program and/or a security engine and/or a monitor program integrated into the protected software.

According to the invention the computer software to be protected (protected software) communicates with a license container which contains a license for using the protected computer software and which contains at least one cryptographic key. The license container provides licenses and cryptographic keys for the protected software to protect its usage and its integrity.

The protected computer software is at least partly encrypted and uses the associated cryptographic keys to decrypt said protected software for executing. The associated cryptographic keys or key is the key which is included in the license container and which was generated together with and/or for the protected software to restrict and control the use of the software and to decrypt the at least partly encrypted parts of the protected computer software.

The Method According To The Invention Comprises The Following Steps:

During the execution of the protected software the behavior of the software and/or the execution environment of the protected software on the computer system is analyzed. Further, during this execution patterns of an intruding program or an intrusion are searched for. In a further step, based on the analysis of the behavior of the protected software or based on the analysis of the execution environment on the computer system, an intrusion into the protected software is detected. An intruding program uses a monitoring component or a monitor program for gaining unauthorized access to the protected software. Upon detecting an intrusion or an attempted intrusion a signal is created. The signal can be a flag or the like which is handled by the protected software, the control program, the monitor program, the security section and/or the computer system for further processing.

BRIEF DESCRIPTION OF THE DRAWINGS

In addition, the invention is illustrated in more detail in the following based on the exemplary embodiment shown in the figures. Further features, forms, aspects and advantages of the invention will become apparent from the description and in the drawings. The particularities presented therein can be used individually or in combination to create preferred embodiments of the invention. In the figures.

DETAILED DESCRIPTION

Figure 1:
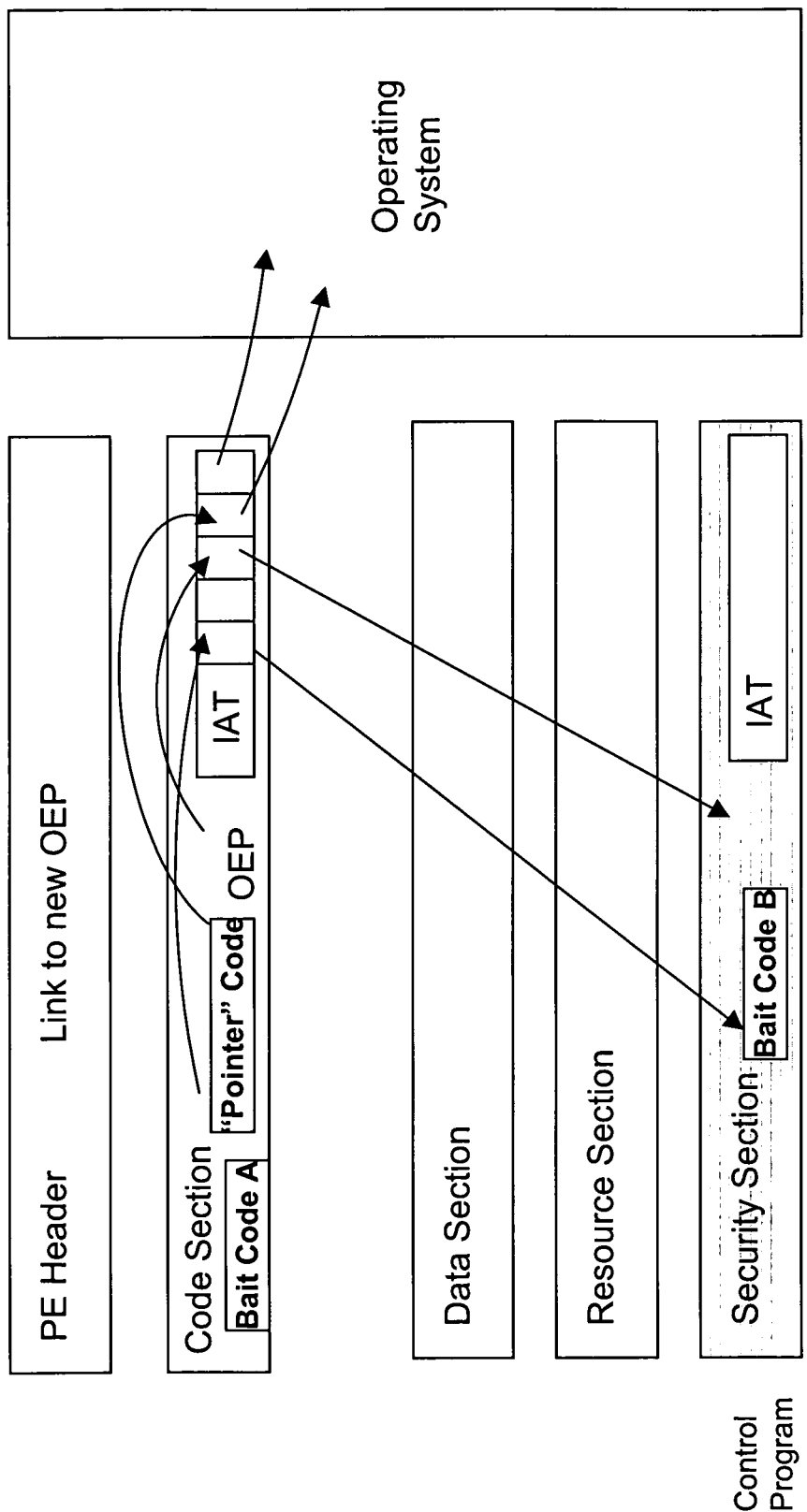
FIG. 1 shows a schematic diagram of an intrusion detection based on embedded bait code.

In the scope of this invention the behavior of the protected software comprises the reaction of the protected software during and/or after executing the protected software. If an intruding program tries to penetrate into the protected software, the reaction of application, the usage of processor capacity of the computer software of the computer system, the overall timing for executing the program in whole or special program or code parts of the protected software may deviate. Further, the term "behavior" also comprises the linking to special logical addresses in the processor or the processor memory.

As described above, the computer system or host computer comprises a security device, typically a dongle used for software protection or a software implemented license container, providing among other security functions an attack-detection-function for detecting and identifying attacks from a local intrusive program running on the same host computer.

The intruding software can be introduced by local means and/or by remote access from a distant networking computer or server communicating with the local host computer. The intruding software can be used for attacking and analysing computer software protected by software protection systems as described in the WIBU-P6 patent EP118477 B1.

The license container, which can be a protection hardware component, which can be a detachable security dongle or a software license container (hereafter called with the general term "license container") provides the license access parameters for a single station computer or for networked computers to unlock the host application software, but not limited. In addition to software also media content or any type of data can be protected by such license container. The term software is here only an example. A more precise definition is given in the section "Protection Target" below.

Many methods are used and known to circumvent an installed protection mechanism provided through a client program to protected application programs. The concepts proposed and described in this invention are countermeasures to detect and prevent different attack methods typically decomposing processes running on a computer host system and circumventing the protection mechanism provided for a targeted application program.

As various as the methods for attacks are as various the countermeasures for detection and prevention mechanisms can be. The inventive concept proposes new methods and combinations thereof to detect and analyze intrusion events and to report them to the protection system in order to organize the defensive measure.

The present invention is used to enhance a license system such as proposed in EP 1184771 B1 for protecting software, multimedia content or any type of data files. A Protection Device acting as license container communicates via the host computer interface and a set of messages with the controlling software to protect the usage and the integrity of the targeted application software. The application software as a standard is encrypted and needs the license and the associated decryption keys to decrypt the application software for program execution. An intruding software may attack such process and may intrude for example into the communication link between the protection hardware and the controlling software for allowing the application program to be executed. Any intrusion event caused by a monitoring software component for unauthorized use (such as using debugger tool for counterfeiting purpose) shall be discovered as early as possible. Also at any interference by an intruding application with the protected application program execution at runtime, the intruding application falsifying data or instructions shall be detected and used to prevent the breach of the integrity of the protected program code or the execution of sequences of predetermined code segments which can represent the execution of single processes.

The integrity of the access restricting components shall be protected through the blocking of the communications link between the license container and a controlling software component surveying intrusion, referred further to as Control Program (or the Control Program Module). Among intrusion resistant schemes already known by one method is described in the manual of the CodeMeter Developers Guide (p. 89) providing the capability of the control program (CodeMeter-.exe) to scan the system for the presence of different types of debugging programs such as user mode debuggers, kernel debuggers, Integrated Development Environment debuggers also called "IDE" debuggers. Prior to starting the protected application program, the control module of the control program for example generates a message to the protection device (CodeMeter) causing the communications link with the software protection control software to be blocked. A usage counter is described to be used for decrementing the usage number of a license. Utilizing the unit counter for intrusion detection allows more than one intrusion detection event to occur prior to de-establishing the usage control system. This is left up to the policy set up for control system enforcing the measures to defeat detected intrusions.

It is an object of the invention to use more complex methods in order to hide where and when during an attack or intrusion the attack prevention measures become active. This is to leave no traces or hints for the intruder or the intruding software during the activation of the attack prevention process.

The control program module or function communicating with the license container can be part of an overall protection control program with many functions not limited to intrusion prevention and license access management. The control program can also be an external part either of a kernel driver of the Operating System (OS) or can be embedded into the application program or protected software itself.

The method described by the invention comprises various detection mechanisms for the detection of intruding software and comprises various measures to protect the hardware device from further communicating with the Control Program and to reveal any communication protocol parameters such as status information, cryptographic keys or secret keys used for the decryption in the protected software of application program respectively.

In a preferred embodiment of the inventive method the analysis of the behavior of the protected software includes e.g. the analysis and the execution of special operation codes embedded in the protected software or the analysis and the execution of special program parts or parts in the protected software code. Further, the analysis of the behavior of the protected software also includes measuring the timing used for executing the protected software and evaluating the measured results. For instance, if intruding software like a debugger executes the protected software, the time for executing the complete software or parts of the software lasts longer than the execution in the undisturbed case without any intrusion.

An example for the analysis of the execution of such special operation codes or special program parts may be the execution of bait code. This is described in more detail below.

The counter measures taken inside the hardware device upon receiving a message indicating intrusion detection may also vary by using different methods to prevent reconstruction or replay of the communications protocol.

Basic Description of Underlying Technology
Protection Target

The invention is used to enforce license information on computer systems. Such a license can on one hand be the permission to execute a certain program and on the other hand be the permission to view or use certain content. The protection of content itself is effected by a specially modified viewer (or other means of using the content) that is capable of decrypting the content. A protected program on the other hand is not only an executable in common sense (e.g. a native windows binary) but can also extent to scripts in various flavors. The most obvious examples are java and ".NET" programs that are currently acknowledged to be programs but also all other types of scripts. As computers grow more and more powerful the difference between "native programs" and "portable scripts" is growing fainter by the day. The mechanisms employed when protecting these kinds of intellectual property are quite the same. Therefore we will term the target of the protection as "protected application" or "protected software" regardless if it is a program in the narrow sense or a script or digital content.

Protection Idea

Figure 3:
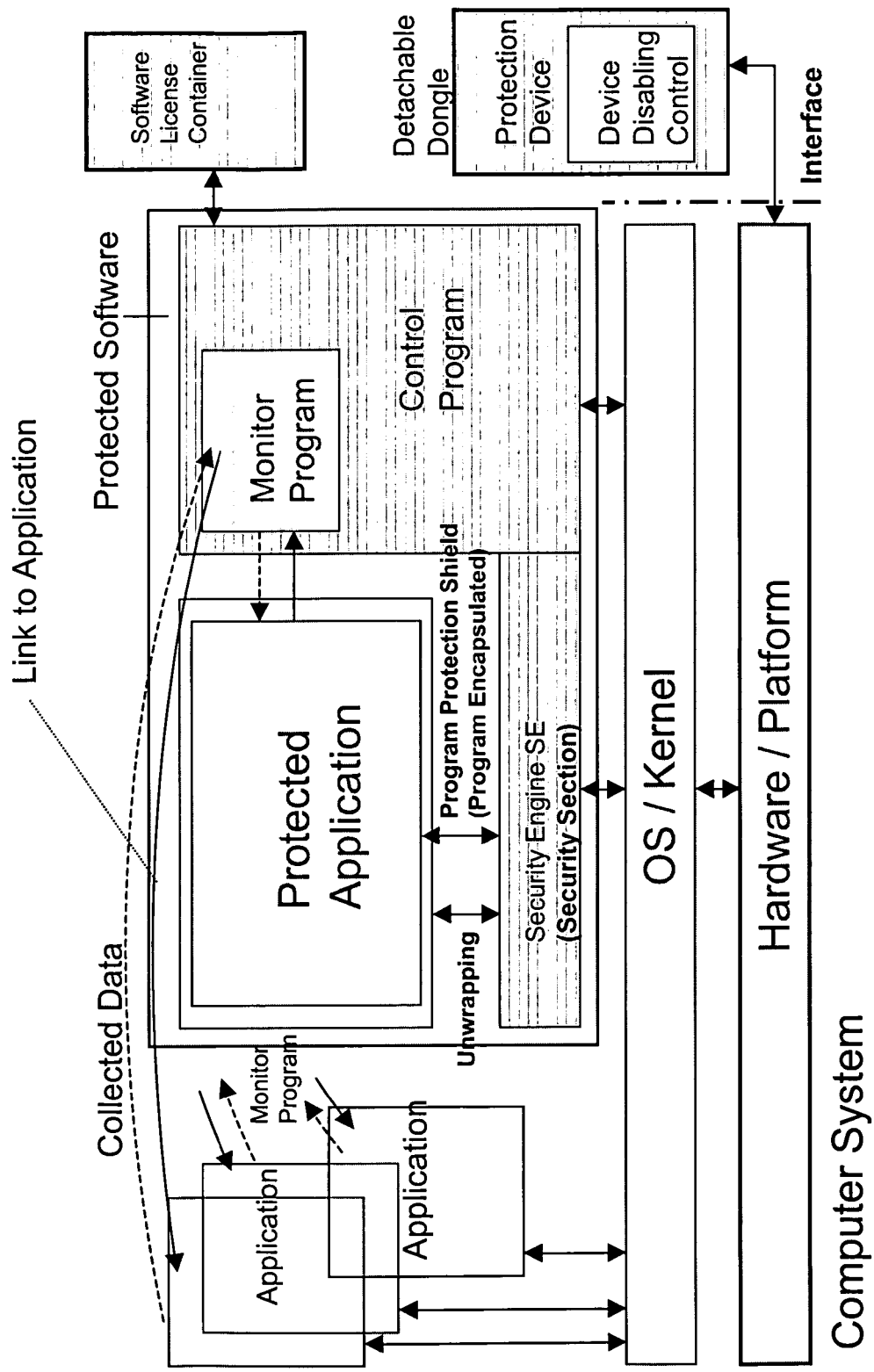
FIG. 3 shows different configurations of the protected software with respect to the operation system of a computer system.
Figure 3:
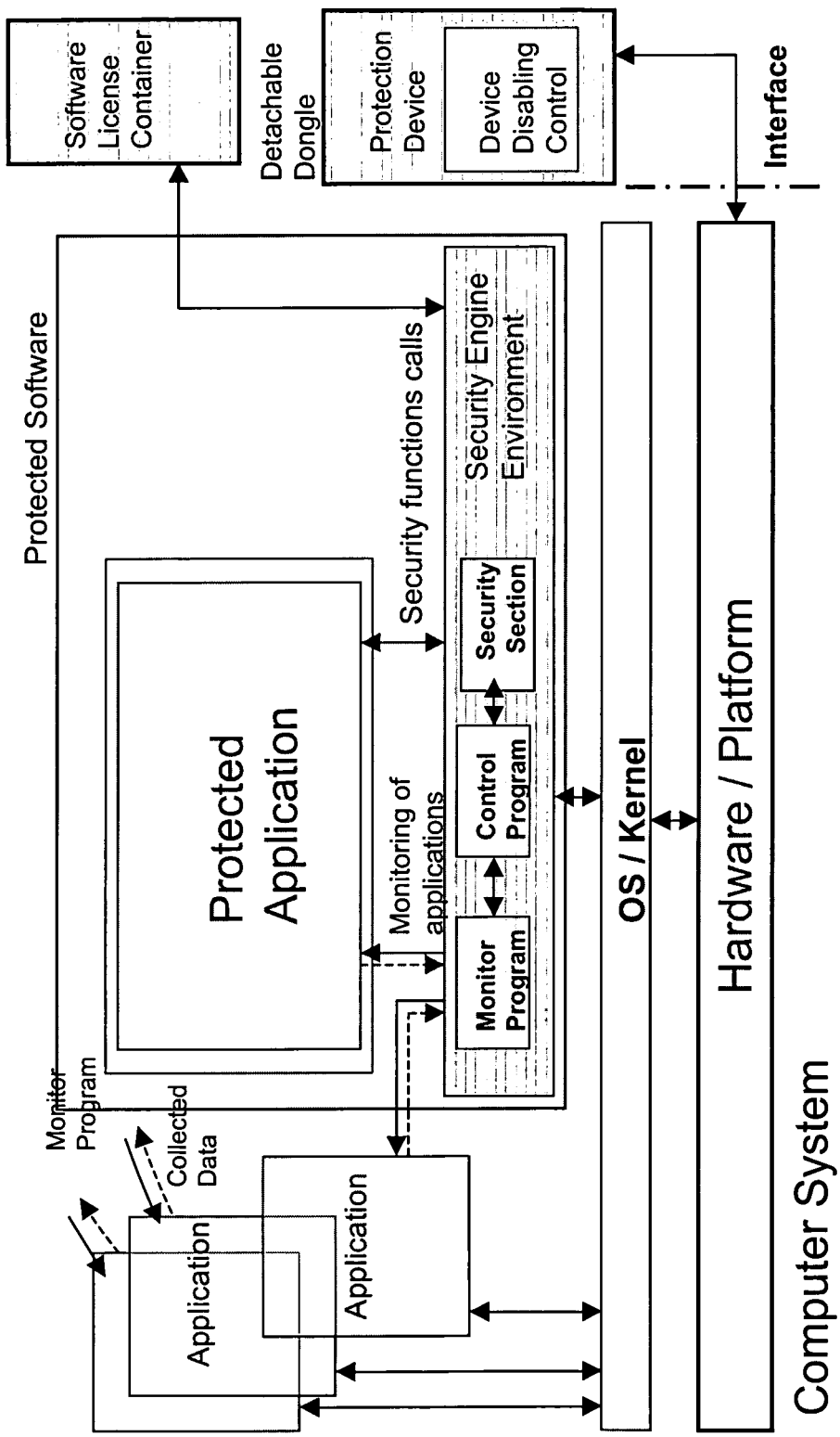
Figure 3:
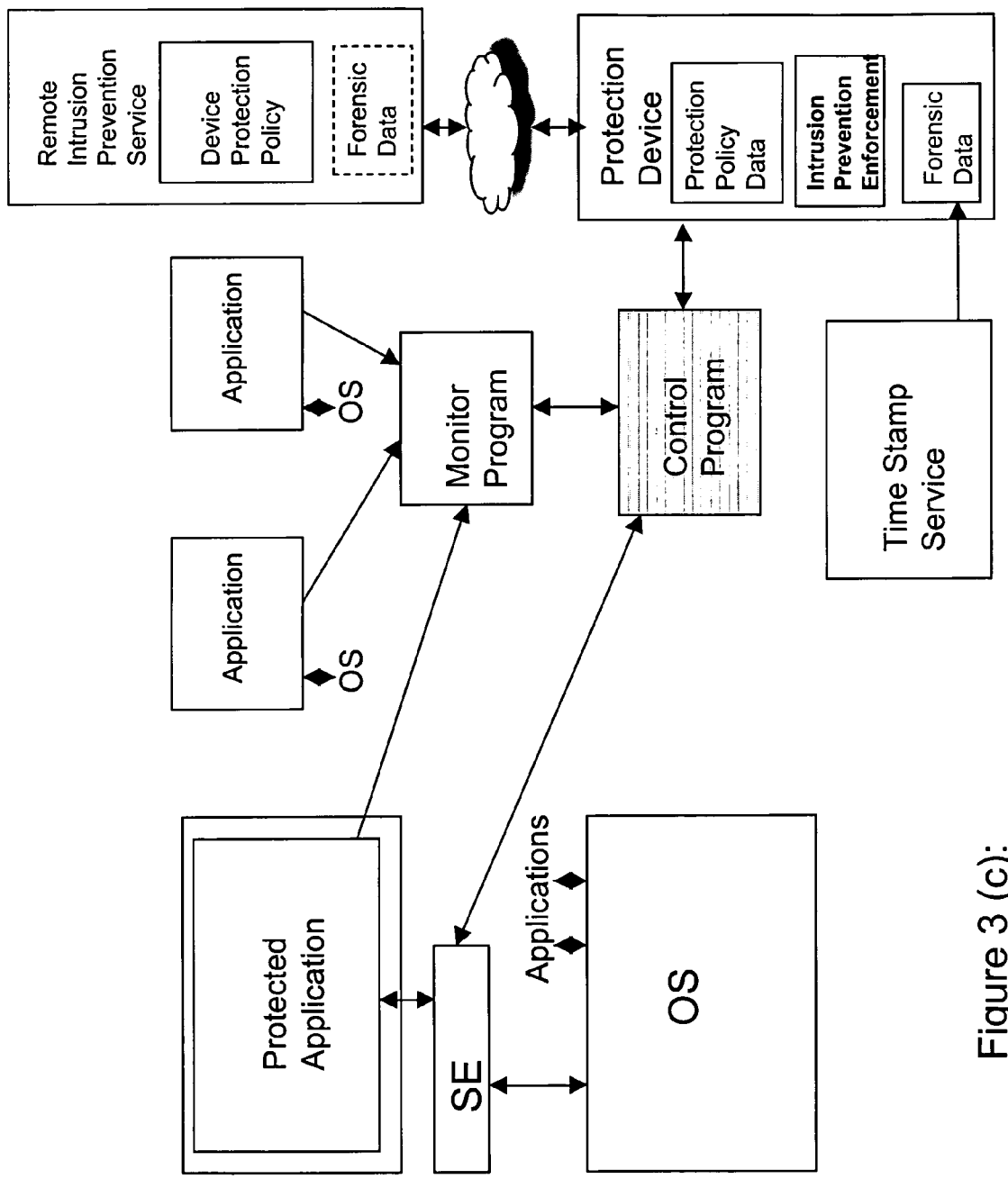

The protection is enforced by inserting special code into the protected program (or the "viewer" in case of pure content). This inserted code is referenced as "security engine (SE)" and is embedded in a so called "security section" that is inserted into the program (which is explained herein with reference to the accompanying figures). As some security services are more generic part of these security services can be decoupled from the protected application and reside in an external "Control Program" (as shown in FIGS. 3a, 3b, 3c). As the functionality can be moved between the different Parts (Security Engine—Control Program) the unit of Protected Application, Security Engine, and Control Program will be treated as a single unit and called "Protected Software" (see FIGS. 3b, 3c).

Protection Technology

A typical Program consists of different parts. The terminology here is taken from the well known windows system but most parts are also used in other systems (Scripting or other platforms).

Figure 1B:
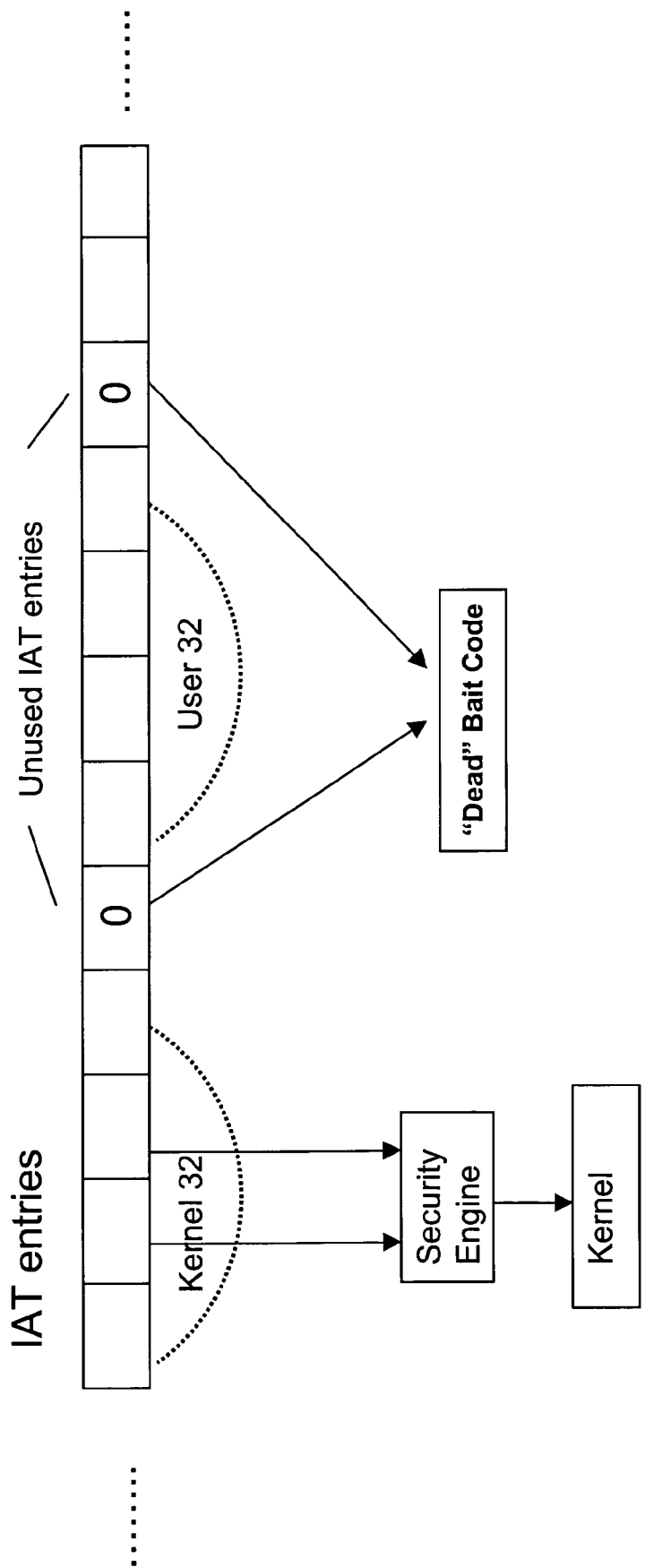
Figure 2:
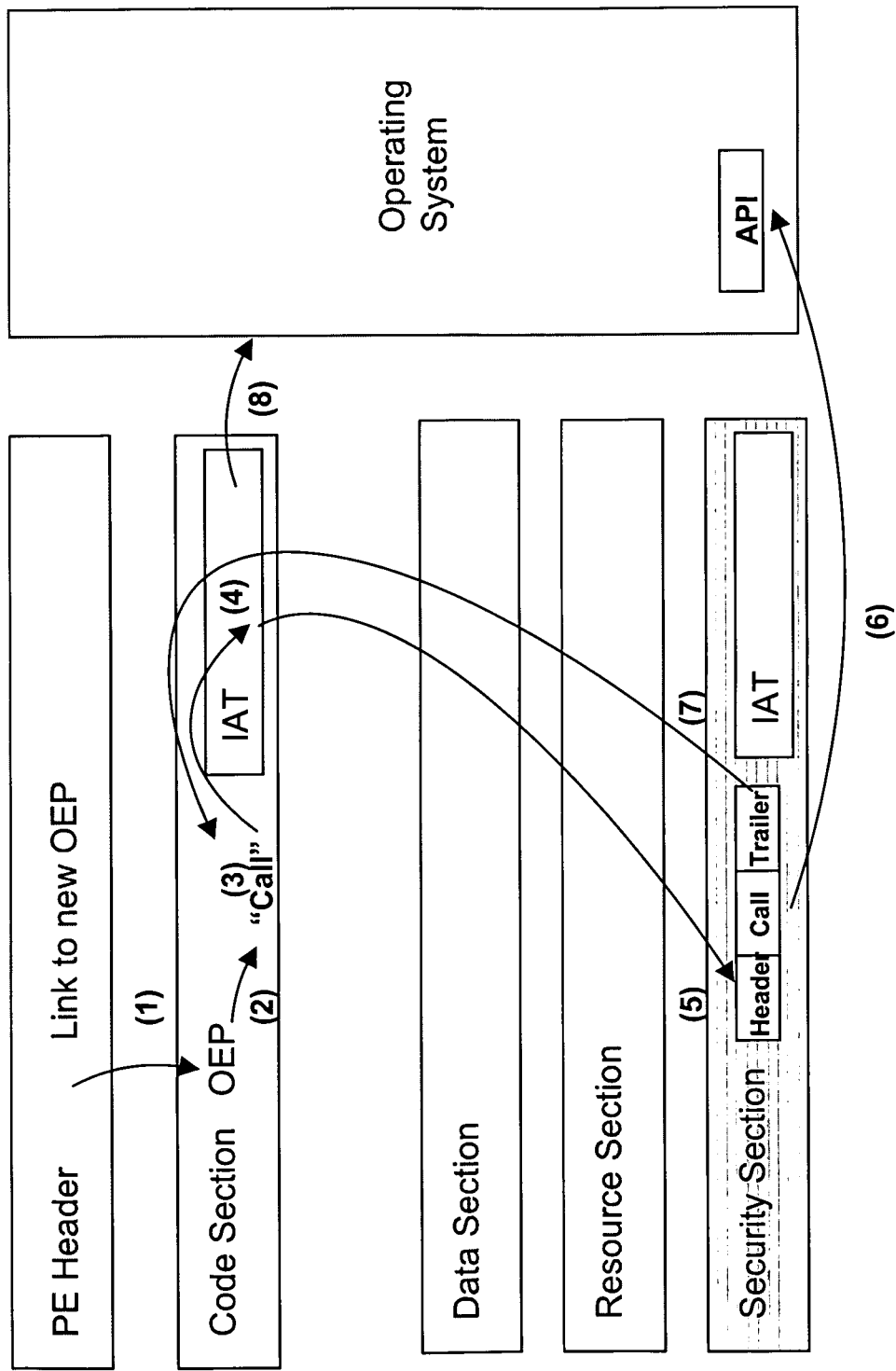
FIG. 2 shows a view of the protected software with an embedded security section.

As can be appreciated from FIG. 2, the program consists of a header that contains some meta information used to load the program and to identify different parts. The Code Section contains mostly executable code. This code can be modified and amended as necessary. Depending on the platform changing and amending the code is more or less difficult. That Data Section contains binary data used by the application. The Resource Section is mostly found in GUI Applications. An access is made from the application itself and from the operating system. The security section is added within the protection process. It comprises the vital parts that decrypt the executable and communicates with the license container or the Control Program. The connection between the executable and the operating system is made through the Import Address Table (IAT). When starting the protected software the operating system puts here the pointers to functions of the operating system (APIs) (see FIGS. 1a, 1b). A protection mechanism can use this table to intercept these function calls. When intercepting the calls usually first an Header is executed, than the API and at last a Trailer (see FIG. 2).

A) The Following Methods for Detection of Intrusion (or Attack) Shall be Used:

An advantageous embodiment of the inventive method is inserting "bait code" in the program code of the protected software or original application program code respectively.

"Bait code" is understood under the terms of the invention as specific program code that appears to be regular program code being part of the application program code (or being part the Control Program controlling the access to the Protection Device) but has no meaning or purpose for the application program itself and is in fact not executed during a regular execution of the application program. For an intruding program it is not possible, without in depth knowledge of the whole application, to provide sufficient analysis to make any difference between bait code and regular application code and to establish from there a preferred strategy for the avoidance of such "program execution traps" represented by bait code. Only at the occurrence of an event of debugging or tracing the bait code for example causes the setting of a marker or a pointer to indicate that the bait code has been executed by means of a debugging process for example. Such event could be interpreted and signaled as the occurrence of an intrusion detection event. Bait code may be scattered at different program locations and not every bait code may be used for signaling an intrusion detection event. In another case the bait code remains encrypted among portions of decrypted and executable code. Such encrypted code may by used advantageously in core parts (of the application program) where the decryption of bait code in such parts is very likely to happen and cause an early discovery of the event. Upon starting the decryption process (of the bait code) intrusion detection would be signaled, see FIG. 1 (a).

Another case for using bait code is to generate a pointer entry in unused areas of the Import Address Table (IAT). The execution of such "dead entries" would trigger an intrusion event as well, see FIG. 1 (b).

Another preferred embodiment of the inventive method includes the detection of partial code execution with wrappers around APIs.

During the program execution a wrapped API is used to access a function the following code sequence of execution is encountered when stepping through the process: one possibility is to insert Header-API-Trailer.

Only the complete execution of the process prevents intrusion detection while the API function call is enforced by the sequence of code.

However, during the attack upon the protected application program in most cases only the Header part will be executed. Not using the Trailer will lead to detection of the unusual behavior in the program execution and causes signaling of an intrusion event. (see steps in FIG. 2)

A further preferred form of the method involves the detection of abnormalities through process monitoring.

It is assumed that a monitoring program (Monitor Program) separated from the application program (or the Control Program) and being executed as a separate process, is used for the tracking of the regular course of the application program execution. In one case of the method applied the timing conditions to run through a defined sequence of dedicated program segments of the application program are recorded by the monitor program and then are analyzed in comparison to template data representing the "undisturbed" execution of the application program. This method is applicable in standard operating systems environments which may not be real time operating systems where timing conditions for program execution remain very stable and reproducible at tight timing conditions for process execution. In case of intrusion, for example while executing bait code, timing conditions for program execution may start to vary and thus may indicate abnormal program execution under the constraints of predetermined timing conditions. A probabilistic analysis function as part of the monitor module may decide for intrusion detection adhering to detection criteria such as worst timing conditions allowed for portions of code sequence. To establish such timing patterns the monitor module may use measurements of processor execution cycles occurring from execution of the predetermined portions of program code.

In another case for establishing and executing the monitoring functions the debugger interface of a debugger itself may be incorporated into the monitor module. Depending on the implementation of the integrated debugger interface into the monitor module any anti-debug measurements implemented elsewhere inside the protection systems have to be considered (vs. the corresponding intrusion mechanisms for debugger detection).

Yet another preferred embodiment of the inventive method comprises an advanced debugger detection.

Timing conditions can also vary when a debugger is used to monitor the application program. In this similar case the monitoring function of the Control Program is able to discover an unexpected timing pattern for the program sequence. The monitoring function may be as well part of a specific kernel driver of the OS or may be part of the application program itself.

A further also preferred embodiment of the invention comprises advanced debugger detection methods by recognition of timing patterns which can be described as follows:

An example is the detection of timing abnormalities in program execution through processor exceptions like invalid operations or access violations. Another example is monitoring and detecting of timing abnormalities in ordinary code execution similar as described using a monitor module.

The setting of breakpoints (i.e. locations at program addresses where program execution will be interrupted) also influence the timing noticeable by the Monitor Program.

Breakpoints set on determined code sections of relevance, i.e. code sections critical for maintaining the integrity of protected data and application program code, lead to execution timing patterns by which intrusion through presence of a debugger can be detected. Different debuggers can have typical timing patterns by which they can be identified through a monitor module.

Another program function can be based on anticipated breakpoint settings, for example on the communications link between the control program and the license container or the protection device. The setting of a breakpoint through a debugger can be detected through pre-defined value settings in predetermined address locations. While the program code is executed at an anticipated location for breakpoint setting in a critical program segment, the monitoring function will look ahead for the pre-defined value entries and thus will stop or circumvent the further execution of critical program code to prevent further debugging steps.

Another method is applied while the monitor program scans the address space which a dedicated debugger typically occupies while being executed. Such memory patterns monitored can be compared to typical memory templates upon which a monitor process analyzes a level of threat encountered through the presence of a certain type of a debugger. This can cause the monitor program to generate or not to generate an intrusion message for the license container or the protection device respectively. If the debugger functions are embedded in the control module for example the encountered memory pattern therefore is not for intrusive but for intended monitoring purposes. In such a case the monitor program disregards the presence of debug functions.

Another preferred embodiment of the invention comprises the detection of unsolicited threads.

Threads are occurring as sub-processes sharing the same resources. On regular basis in the course of the execution of the protected program multiple threads are using the same state information of the single main process and they are sharing address spaces and other resources such as file I/O. Intrusion shall be signaled upon detection of unsolicited threads.

This can be achieved through different measures:

a) Monitoring of the APIs for creating threads in order to obtain a list of valid threads:

The monitor module provides a function for surveillance of threads being executed under regular API function calls and maintains a list of allowed threads. If an unsolicited threat is created from an outside process, the monitor module would detect this thread and would signal an intrusion by unsolicited thread.

b) Monitoring of the creation of threads using "TLS"-code:

Thread local storage (TLS) is a reserved and from the OS assigned storage area where threads use the common storage for interoperation and data sharing. All threads therefore execute the defined "TLS-code" to initialize their local data. This code can be used to monitor the creation of all threads and an unsolicited thread, which has not been created in the original process room, will be identified and signaled by the monitor c) Detection of API-calls by "unauthorized threads":

Unauthorized threads created from outside of the process room using a wrapped API consisting of Header, API and Trailer will also be detected by the monitor module and cause the monitor module to signal intrusion detection.

B) Measures Taken Upon Detection of the Attack or Intrusion:

The protection device operating and communicating with the control module (through the control program) for receiving information on intrusion detection, which can be a message containing such information, will be blocked from further access through the control program or will be put on a different state (wait state) depending on the enforcement policy and dependent of the type of intrusion detected. The intrusion detection mechanism can be embedded in the control program (1), can be part of the protected software or the Protected Application program itself (2), can be part of a separate monitor program (3) or can be an embedded function or program code of an OS kernel driver (4).

The denial for further access can affect a protected license unit counter held in the license container, the access for protected data such as secret program or cryptographic keys or content encryption keys and other type of protected data to be shared with the control program.

For example, in the case of a hardware protection device, for example in the form of a dongle or a USB stick, the locking of the protection device, the device including for example a license container, can be caused through setting a flag following the receiving signal of a detected attack. The disabling of the protection device can be effected further by disabling the device communication by decrementing a usage counters or setting an intrusion detection flag, which can be reversible or irreversible and can also be effected by purging internally stored secret keys or cryptographic keys.

Upon receiving a determined intrusion detection message from the control program, the mechanism for deletion of keys can be activated. The communication with the protection device can still continue with the control program but requests to access critical keys for executing a decryption process on the host side, where the specific attack has been detected, will be denied.

The disabling of the protection device can be effected by using covered locking mechanisms involving common APIs being used with special but indistinguishable parameters In this case, the path for protection can be chosen when a commonly used API is used for function call and the parameters invoked may not be recognized as unusual, such as the return values of a cryptographic operation, a specific text, or an action for storage. Upon receiving such indistinguishable parameters marked as intrusion detection parameters the locking for the protection device or activation of "alert"-mechanism would be invoked.

A further possibility of disabling or locking the protection device is locking depending on the outcome of a decryption operation.

At different locations in the application program and at locations in the control program cryptographic functions for the decryption of keys or parameter may be invoked (i.e. by call of a wrapped API function) where the return values of such decryption operation may lead to signaling of intrusion detection upon a result of a comparison operation to predetermined values. Such comparison can be executed under the sole control of the protection device, after such encryption values have been transmitted to the device.

As an Example:

The modification of the original code can be used to disable standard analysis methods. For example the modification of API calls can cause the program to invoke the security engine and get return values upon decryption of encrypted input parameters received from the control program prior to encryption. The return values transmitted by the control program to the protection device can start the further processing of the return values such as simple matching and comparison to predetermined values inside the protection device. As an example, the modification of the original code can have been caused by the execution of "dead" bait code.

C) Collection of Forensic Evidence

Upon detection of an attack the protection system can collect forensic evidence to enable later legal steps against an attacker. The forensic data is designed to later identify the attacker or at least his computer. The forensic data can therefore contain the following data but is not limited to this data:

Hardware identification of the computer like
- Hardware address of network card
- Serial number of different computer components like processor, motherboard, hard disk, graphics card
- Release and manufacturer data of different computer components Software identification of the computer like
- Volume serial number
- OS license number User identification like
- Mail addresses
- User names In order to collect further evidence for intrusion the following means or steps can be applied:

a) Disabling the hardware to jeopardize further attacks and to motivate the original licensee to contact the licensor in order to restore the license.

Upon detection of the Protection Device being disabled the licensee will apply for the restoring of the lost access to the license and the content. This will allow the licensor to collect data for tracking records and establishing policies for restoring licenses to disabled protection devices.

Upon the licensors decision the device functionality or a portion of the device functionality can be re-established in restoring a single or multiple license access functions. The licensor can aggregate the collected data himself or can instead transfer the data to a central instance (Intrusion Prevention Service) to generate a global view of the current threat scenario. Upon evaluation of these aggregated data new response policies for locking of Protection Devices can be generated. These policies are either distributed centrally by for example a central time server or by the licensor in the procedure of license and software updates. In the scope of the invention the terms licensee and licensor not only refer to legal entities but also comprise the used computer, computer system or server. The licensor in this case is normally remote to the computer, on which a licensed software is stored and will be executed, protected by a license key or cryptographic keys. The licensor comprises a server on which information regarding licensed software or application programs, license information, license keys and/or cryptographic keys are stored.

b) Collection of evidence in "write once" memory protected against overwriting

Writing or recording of intrusions detected into write once memory can follow upon detection of such event while using time stamped date and time for each intrusion recorded.

On a regular basis the licensor can visit the protection device to collect the data for forensic evidence. The licensor can revoke the license upon its own intrusion detection policy by sending a device disabling command to the control program which passes on such command to the device itself. The license container or protection device is assumed to be able to act as a protection device for multiple licensors to license their respective protected software or application programs to the user of the protection device. Therefore, it is likely to occur that more then one application program is protected by same the protection device. According to type of the application program that is being executed under the protection device more than one type of intrusion can occur and be detected. This means that a specific intrusion detection mechanism can be applied in one type of application but in another type of application it may not. Therefore it can be required to record or audit intrusion events for forensic tracking inside the protection device pursuant to different types of Protected Application programs used and eventually exposed to different types of attack for intrusion for a period of time prior to disabling the device.

The revocation process of licenses, such as erasing key access or denying access to stored secrets, or blocking the communication with the device can be directed and limited only to the set of specific licenses that a licensor owns and has granted to a licensee. In a case where the stick holds licenses of multiple licensors, the revocation policy of single licensor will be set in such a manner that intrusion events of a certain (minor) level of security breach would not effect to the licenses which are hold by other licensors and which are under control and responsibility of a single licensor. It can be envisaged that other protected applications will still be operable with the protection device, as long as intrusions are not directed to the generic security preventions controlled by the control module itself for example and not being essential to all Protected Applications. It can be understood that a revocation mechanism can be scalable and that is classified as single application revocation event or that it can be extended to a total device revocation.

Still another aspect of the invention is to cover forensic tracking on multiple computer platforms, since the device is portable and may be used on multiple computers encountering different threats for intrusion. Still another scenario may imply, that different computers based on different Operating Systems, are used for the same Protected Application. Therefore forensic tracking under the aspect of multiple environments encountered may require auditing of intrusion inside the protection device under the above aspects.

The collection of information of intrusion events may be more appropriate for a dedicated number of events before disabling the device through enforcement of the intrusion prevention policy embedded into the device. Another advantage for storing the collected audits at a secure storage location inside the protection device is to provide the audit data to a licensor's service, to the Remote Intrusion Prevention Service in the internet by secure transmission. As part of a restore file for back-up of license parameters the transmitted audit data may be used for later evaluation in a policy server for different purposes. In one aspect the data may used for example for actively re-enabling a disabled a protection device according to the policy of the intrusion prevention services. In another aspect it may be advantageous for the service to analyze the forensic data in the context of multiple intrusions events audited from multiple protection devices.

As a further aspect there may be time parameters set for activation time and expiration time where intrusion events may be monitored inside the device during a defined period.

Upon recording of the audit, which may report at least a single intrusion event, the device may request a timestamp for the association with the event. The protection device may transmit under the support of the control program the forensic data to the Remote Intrusion Prevention Service.

Pursuant to the example in FIG. 1 (a) Bait code may be deployed in the Executable at different code sections including an area which is defined as security section (in the Control Program). The IAT (pointer) addressing scheme provides an example for usage of bait code in the Security Section and API calls towards the operating system. The "Pointer" Code (the link to the bait code) causes the program to jump into the Security Section. By monitoring and analysing the execution of bait code at a dedicated location in the Security Section the Control Program may signal a case for intrusion to the protection device.

Unused IAT entries here marked as "0", which occur as separators at calls of the OS, such as "Kernel32" or "User32", may be used for pointing to "dead" bait code included in the code section for execution. The control program or the monitor program could report then such execution of bait code invoked from the unused IAT entry location as an indication for an intrusion event occurred.

FIG. 2 shows the general scheme of the program flow within a protected application to show the differences between an unprotected application and a protected application.

1. In the Program Header is a link to the OriginalEntryPoint (OEP) of the application this is the point where operating system starts the execution. When protecting a program, this value is modified to point into the Security Section.
2. From the OEP onward the code is executed.
3. At many points there will be "calls" to operating system functions.
4. A pointer to the called function is placed by the operating system in the so called Import Address Table (IAT). When protecting the application may of these pointers are redirected into the Security Section
5. In the Security Section a Header preceding the execution of the intended function is executed. This header might do some anti-debugger-checks
6. After the Header the original Function (API) is invoked.
7. After the Function a Trailer is executed inside the Security Section cleaning up the allocated program stack and possibly doing more anti-debugger-checks. The Trailer returns the program execution directly to the protected application.
8. With an unprotected application the IAT points directly into the operating system. For protected applications there might also be some pointers in the IAT that are not redirected into the Security Section as every redirection has a significant impact on the overall performance.

By executing only the Header of the Wrapped API, an event for intrusion would be detected by the control program in the course of further program execution.

According to a further preferred embodiment of the invention, intrusion detection is performed by generating hash values and comparing them to the expected values for intrusion detection.

Messages generated through the control program and transmitted to the protection device may use CRC (Cyclic Redundancy Checking) or other hash algorithms for message data integrity. As well the message may be signed by public/private key algorithm to authenticate the control program by the protection device. The Monitor Program, if installed as self containing process communicating with the Control Program, may use the same methods ensuring for data integrity and message authenticity while communication occurs with the Control Program. For that purpose the Monitor Program may have a direct link with the Security Engine for the execution of security algorithms.

In a preferred embodiment the Security Engine is assumed to run in future platforms in a sealed memory area controlled by a TPM (Trusted Platform Module) to provide a higher level for tamper resistance for the execution of security relevant function calls. The sealed memory shall be a dedicated RAM area reserved for restricted program execution with exclusive rights granted for a single program to be executed in that defined area. A TPM embedded to a protected platform provides the standardized methods to assign sealed memory to a program.

As described in the above methods the protection device may receive a message from the Control Program signaling status of attack from intrusive program code and the device thereupon authenticates the message and checks for data integrity. In a further step the device may disrupt the communication with the Control Program pursuant to an intrusion enforcement policy embedded into the device.

In the diagrams shown in FIGS. 3a,b,c some of the preferred embodiments and arrangements of the mayor systems components of the intrusion prevention system shall be depicted and represented by their respective functions.

Description Architecture Overview

FIG. 3a shows basic system functions of the Intrusion Detection System comprising Control Program, Protection Device, Protected Application, Security Engine and Monitor Program.

The platform of computer system communicates via electrical interface (i.e. USB interface) with a protection device. The control program communicates by control messages with the protection devices through the Operating System (OS) of the Computer System. If a message for intrusion is received by the protection device the message will be evaluated in the Device Disabling Control Function and the device will disabled from further communication, such as providing decrypted or accessible data to the Control Program, upon encountering of a criterion indicating a match for intrusion detection.

Embedded into the control program the monitor program may be executing monitoring functions for external application programs running outside the control of the protected software. As a first task it does the monitoring functions for the protected application through tracing and recording the execution of the program, but not limited to, if program surveillance of other programs may be required from the perspective of intrusion prevention. The collected data are then transferred to the monitor program and communicated via the control program to the protection device.

The protected application uses the APIs of the Security Engine SE equivalent to the Security Section of the application under protection. The function calls pass through a filter and may be routed further to the OS including the relevant kernel functions needed by the applications. All other calls are related to the specific functions inside of the Security Engine, such as the unwrapping of a protection layer acting as program shield to the Protected Application.

FIG. 3b shows the control program and the monitor program embedded into Security Engine environment.

As a further embodiment, the control program and monitor program shall be embedded into Security Engine environment. The control program communicates with the monitor program and the Security Section inside running in one process room only. In one aspect of the invention this can be advantageous for the portability of the protected application and achievements of a higher level of the program integrity in a trusted computing environment using a TPM as described. Also the API for the protective application can become simplified while supporting functions for monitoring applications and security functions calls.

In another scenario, not depicted here, the monitor and control program can become a kernel function of an operating system (OS) and can be invoked by the Security Engine. Different OS can require different, preferred implantations of the systems functions into a supported platform.

FIG. 3c shows logical links between Function Blocks and an included Remote Intrusion Protection Service.

In the diagram describing logical links between function units a remote service function is shown providing connectivity with a protection device by means of internet communications for example. This function can be a complementary service function of a licensor's established service for providing licenses to be stored in one of the license containers of the protection device and granting usage rights to a protected application. While having full control on the license management of software and content the licensor may wish to monitor and control attacks that have happened to the protected system, regardless whether it is the license system in place (such as the DRM system described in EP118477 B1 which is included in this application by reference) or a specific protected application to be kept free from attacks for intrusion.

According to the invention the protection device, operating in a master-slave function with the host computer system, can have as an additional function the capability to autonomously store and analyze intrusion events gathered as collective data across multiple platforms as it can occur in a mobility scenario. Further pursuant to the capability to investigate the level of threat the Intrusion Prevention Enforcement Module can disable the further communication with the control program and may selectively invalidate data for further usage or exposure from security breach. Behaviour patterns (containing for example methods and frequencies of attacks) of debug processes recorded can be analyzed by the enforcement module and can lead to disabling of the protection device.

As an example, further the device can recognize the presence of a TPM and can thus allow a different threat model to be applied being less sophisticated due to the fact that security can be established and be enforced at higher basic level than compared to an open, unsecured system much more prone to intrusive code being executed. The protection policy data downloaded into the protection device can govern the intrusion prevention enforcement module for execution of analysis according to the policy for enforcement mandated through the Intrusion Prevention Service. By validating attributes of intrusion events, provided through analysis of forensic data, evidence can result in identifying a type of intrusion and a classification of a level of threat. Thus the protection device can shut down (according to its intrusion prevention policy of the embedded enforcement prevention module) a single application independently from assistance by a remote system.

This functionality, as described above, can be understood as a partial device revocation causing the dedicated application to expire without external interference through a central revocation service. The protection device as part of the Intrusion Prevention System makes a difference to methods used in known DRM systems for content protection, making it a requirement for a central service in order to maintain system integrity by revoking devices or content by revoking the corresponding keys. However, in case if a large population of protection devices is out in the market it can be appropriate to collect forensic data in a central service and to decide on a central policy based on customer data and threat analysis on the revocation of single device or a multitude of devices. Appropriate messages shall be generated be and sent from remote intrusion prevention service for authorized re-activation or revocation of each individual protection device.

System capable of flexible responding to intrusion events according to set of policy rules. The policy rules are provided by a remote Intrusion Prevention Service (Internet based) (see FIG. 3c) and can be updated upon routine contacts for license or time updates. Part of the policy rules can also be part of the generic runtime system of the license container (Monitor Program, Control Program, Kernel driver). An update of this runtime system can also update the policy. The updates respond to newly discovered threat scenarios.

According to the policy rules the available intrusion detection methods (state of the art or as specified in the claims) are used and categorized. According to the policy the grade of an attack is determined and a response is determined. The response can be a locking with different persistence:

none (no lock at all, ignore the attack)
    temporary (e.g. 5 Minutes, slow down automated attacks)
    permanent and can influence different parts of the system:

license
    license container
    protection device

The influence of the system part leads at the end to a locking (of the execution) of the protected software. The local recording and later transmission of the forensic data is also configured by the policy.

In the scope of the present invention the term "protected software" is a synonym for a protected application or a computer software application program, which is protected by a license container or a protection device, providing a license stored in the license container (which may be part of the protection device) or usage of such an application software in accordance with the terms of the license. This is also called an authorized use of the protected software, which is normally licensed. The protected software is also the protected program code, which is encrypted at least in significant portions thereof in order to prevent program execution in an unprotected environment and to prevent intrusion by an intruding program or an intrusive software such as debuggers at the program execution time.

The protected software in the scope of the invention may include a security engine and/or a control program and/or a monitor program.

The security engine is a software component, which provides cryptographic functions that work on the host side as independent components in order to communicate with the other involved components of the intrusion protection participating in the system. These other involved components comprise at least the license container.

On one hand, the security engine communicates with the protection device or a license container through the OS/Kernel of a given hardware platform of a computer system in order to access license conditions, keys or other license parameters to allow the protected application to be executed. For example, this can be achieved by decrypting protected portions of the application program or by unwrapping the encapsulated application from a so-called program protection shield for program execution. In a further link, the security engine can communicate with the control program to exchange parameters that are provided to the monitor program through the control program. In another embodiment the security engine can also encompass the monitor program, the control program and a security section.

The control program itself is a program module controlling the access of the license container or the protection device. The control program function can be a part of general purpose protection control program. It can establish a communication link between the license container and the controlling software. It can also provide monitoring functions for the intrusion protection.

The term protection mechanism is a specific method or a combination of methods to detect an intruding program, which tries to protect the protected application program or protected software. The protection mechanism signals an intrusion event to a monitor program, to the security engine or to the license container, the protection device respectively.

In the scope of the invention the monitor program provides monitoring function for surveillance and registration of threats (for example attacks) caused by an intrusion program. The monitoring functions can be embedded into other programs, e.g. in a monitor module. The monitor program uses intrusion detection mechanisms, which can generate target attributes, like a so-called intrusion detection criterion, for the description of intrusion events. In other words, a monitoring program which uses monitoring components for monitoring other program or computer events.

Further, in other words an intrusion prevention system is a system consisting of a protection component, e.g. a protection hardware device or a license container, and an arrangement of software components, such as a control program, a monitor program and/or a security engine and a back-end and software system communicating with each other and the protection device or the license container. These are typically protecting an application program against an intrusion of an intruding program. The back-end system can also include a remote policy server, which provides a remote intrusion prevention service to influence or control the behavior of a single protection device or license container. In this context, the word behavior comprises the execution, the access, the locking, or the restriction of access to the license container or the protection device and/or the erasure of information stored therein.

One further aspect of the invention relates to a system for providing intrusion detection for protected computer software on a computer system by using system components and with a protection device being adapted and arranged to be attached to the computer system. The computer system comprises at least a monitor program, a control program, and the protected software.

The monitor program communicates with the control program through messages containing audit information from the protected software (protected application program) for program execution on the computer system. The control program has functions for communication with the protection device attached to the computer system wherein the protection device receives an intrusion prevention specification from a remote intrusion protection service provider server in the internet. The intrusion prevention specification specifies at least one target attribute to be recorded from a set of possible target attributes generated during a monitoring process by the monitor program.

The intrusion prevention specification also specifies at least one monitoring criterion that triggers recording of at least one target attribute during the monitoring process. The monitor program is adapted and configured to record the at least one target attribute in response to detecting the at least one monitoring criterion and the monitor program runs (being executed) to produce an intrusion log by recording the at least one target attribute in response to detecting the at least one monitoring criterion. Further the intrusion log is examined to detect patterns for intrusion detection purposes like the locking of the protected software or the protection device.

The invention claimed is:

1. Method for protecting computer software by detecting an attack of an intruding program interfering with the execution of said protected software on a computer system with a processor and at least a processor memory, the processor executing the protected software,
   wherein the protected software comprises a code section containing executable code of an application program and a security section containing a security engine, the protected software further including in the code section or security section bait code that is executed only in case of an intruding program uses a monitoring component to gain unauthorized access to the protected software,
   wherein the protected software communicates with a license container containing a license for using and executing the protected computer software and containing at least one cryptographic key for decrypting the protected software,
   wherein the license container provides at least one license and the at least one cryptographic key for use by the protected software to protect its usage and its integrity, the at least one license comprising one or more license parameters selected from a group consisting of number of licensed uses, condition of use, time period of use, and number of users for the protected software, and
   wherein at least a portion of the protected computer software is encrypted and the security engine uses the at least one cryptographic key to decrypt the at least one portion of the protected software for executing,
   the method comprising:
   during execution of the protected software, searching for patterns of an intrusion into the protected software;
   detecting with the security engine an intrusion by an intruding program into the protected software during the execution of the protected software, wherein the intruding program uses a monitoring component for gaining unauthorized access and detecting with the security engine comprises detecting execution of the bait code; and
   creating a signal on detection of an attack.

2. Method according to claim 1, wherein searching for patterns of intrusion into protected software is comprised of analyzing the executing of special operation codes in the protected software.

3. Method according to claim 1, further comprising locking the license container by executing an arbitrary command in the protected software with predefined special values.

4. Method according to claim 3, characterized in that the arbitrary command is a special encryption operation to lock the license container.

5. Method according to claim 3, characterized in that locking of the license container is performed by setting a counter to a predetermined value, preferably zero, or in erasing the necessary cryptographic keys in the license container.

6. Method according to claim 1, wherein analyzing the behavior of the protected software comprises analyzing the execution of Application Program Interfaces (APIs) and comparing the number of header-executions to the number of trailer-executions.

7. Method according to claim 1, wherein the bait code is referenced in unused parts of the Import Address Table (IAT) of the protected software.

8. Method according to claim 1, characterized in that the bait code is part of the protected software that is never executed under undisturbed operation conditions.

9. Method according to claim 1, wherein a protection device is attached to an interface of the computer system which includes the license container.

10. Method according to claim 1, wherein the bait code locks the protection device using a specially designed API call.

11. Method according to claim 9, characterized in that after detecting an attack of an intruding software, forensic data is created for memorizing an intrusion event and is stored in the protection device.

12. Method according to claim 11, wherein the forensic data is stored in protected memory in the protection device.

13. Method according to claim 11, wherein the forensic data is stored in encrypted form.

14. Method according to claim 11, wherein the forensic data is stored in a memory region of the protection device that can be written only once.

15. Method according to claim 11, wherein the forensic data is aggregated and evaluated to detect global patterns.

16. Method according to claim 11, wherein the forensic data is sent to a license administrator and the cryptographic keys are contained in the license containers, the forensic data is sent for being collected by the license administrator for the purpose of eventually unlocking the protection device at a later time.

17. Method according to claim 2, characterized in that measuring the timing used for the executing of the protected software includes evaluating the timing of processor exceptions.

18. Method according to claim 2, wherein measuring the timing used for the executing of the protected software includes checking the overall clock consistency.

19. Method according to claim 1, wherein analyzing the behavior of the protected software includes classifying execution threads as one of (a) authorized threads being created by the normal program execution and (b) unauthorized threads being created by an intruding program.

20. Method according to claim 19, further comprising discovering unauthorized threads using TLS-procedures (Thread Local Storage-procedures).

21. Method according to claim 19, further comprising discovering unauthorized threads by monitoring the execution of API-system-calls.

22. Method according to claim 1, wherein analyzing the execution environment of the protected software on the computer system for identifying an intruding program includes examining other processes on the computer system for detecting predetermined patterns.

23. Method according to claim 22, wherein window and class parameters or process and file names are inspected for detecting predetermined patterns of intruding programs.

24. Method according to claim 22, wherein the process memory of other processes on the computer system is inspected in part or in whole.

25. Method according to claim 3, wherein a protection device attached to an interface of the computer system comprises at least one license container characterized in that not the complete protection device is locked but only the license container assigned to the protected software, for which an intrusion has been detected, is locked.

26. Method according to claim 3, wherein a protection device attached to an interface of the computer system comprises at least one license container, and the computer system is configured and arranged to communicate with a remote timestamp server; and wherein locking the protection device is affected upon a communication between the computer system and the timestamp server required to continue the operation of the protection device.

27. Method according to claim 11, further comprising transmitting the forensic data to a remote server of an intrusion prevention service and in unlocking the locked license container using a special command or code being sent from the remote server of an intrusion prevention service.

28. Apparatus for providing intrusion detection for protected computer software on a computer system by using system components comprising:

a monitor program executing on the computer system communicating with a control program executing on the computer system through messages containing audit information from the protected application program for program;

said control program in communication with a protection device attached to said computer system, the protection device receiving an intrusion prevention specification from a remote intrusion protection service provider;

wherein the intrusion prevention specification specifies at least one target attribute to be recorded from a set of possible target attributes generated during a monitoring process by the monitor program; and the intrusion prevention specification also specifies at least one monitoring criterion that triggers recording of at least one target attribute during the monitoring process;

the monitor program records the at least one target attribute in response to detecting the at least one monitoring criterion produces an intrusion log by recording the at least one target attribute in response to detecting the at least one monitoring criterion;

the protected software comprises the original software code of an application program contained in a code section and a security engine contained in a security section, the protected software including in the code section or the security section bait code that is executed only in case of an intruding program uses a monitoring component to gain unauthorized access to the protected software;

the protection device is comprised of a license container, the license container providing a license comprising one or more license parameters selected from a group consisting of number of licensed uses, condition of use, time period of use, and number of users for the protected software.

29. Method according to claim 1 further comprising analyzing the behavior of protected software.

30. Method according to claim 1, further comprising analyzing the behavior of the execution environment.

31. Method according to claim 1, wherein analyzing the behavior of the protected software is comprised of analyzing the executing of special program parts or parts of the protected software code.

32. Method according to claim 1, wherein analyzing the behavior of the protected software is comprised of measuring timing used for the executing of the protected software and evaluating the measured results.

33. A non-transitory computer readable medium storing instructions for causing a computer to perform a process for protecting computer software by detecting an attack of an intruding program interfering with the execution of said protected software on the computer, the computer comprising a processor and at least a processor memory, the computer software to be protected being at least partly encrypted and communicating with a license container containing at least one cryptographic key and using the at least one cryptographic key for decrypting the protected software for execution, wherein the license container provides a license comprising one or more license parameters being selected from a group consisting of number of licensed uses, condition of use, time period of use, and number of users for the protected software; the computer software comprising the original software code of an application program contained in a code section, a security engine contained in a security section, and bait code executed only in case of an intruding program using a monitoring component to gain unauthorized access to the protected software; the process comprising:

during execution of the protected software, searching for patterns of an intrusion into the protected software;

detecting with the security engine an intrusion into the protected software during the execution of the protected software, wherein the intruding program uses a monitoring component for gaining unauthorized access; and creating a signal on detection of an attack.

34. The computer readable medium of claim 33, wherein the protected software comprises the original software code of an application program and software selected from the following group of types of software: additional code, special operation codes, a security engine and control program code.

35. The computer readable medium of claim 33, further comprising locking the license container by executing an arbitrary command in the protected software with predefined special values.

36. The computer readable medium of claim 33, wherein analyzing the behavior of the protected software comprises analyzing the execution of application program interfaces (APIs) and comparing the number of header-executions to the number of trailer-executions.

37. The computer readable medium of claim 33, wherein a protection device is attached to an interface of the computer system which includes the license container.

38. The computer readable medium of claim 33, wherein analyzing the execution environment of the protected software on the computer system for identifying an intruding program includes examining other processes on the computer system for detecting predetermined patterns.

39. The computer readable medium of claim 33, further comprising analyzing the protected software.

40. The computer readable medium of claim 33, further comprising analyzing the behavior of the execution environment.

41. The computer readable medium of claim 33, wherein analyzing the behavior of the protected software is comprised of analyzing the executing of special program parts or parts of the protected software code.

42. The computer readable medium of claim 33, wherein analyzing the behavior of the protected software is comprised of measuring the timing used for the executing of the protected software and evaluating the measured results.

43. Method for protecting computer software by detecting an attack of an intruding program interfering with the execution of said protected software on a computer system with a processor and at least a processor memory, the processor executing the protected software, wherein the computer software to be protected communicates with a license container containing a license for using and executing the protected computer software and containing at least one cryptographic key, wherein the license container provides the license and at least one cryptographic key for the protected software to protect its usage and its integrity, the license comprising one or more license parameters selected from a group consisting of number of licensed uses, condition of use, time period of use, and number of users for the protected software, and wherein the protected computer software is at least partly encrypted and uses the at least one cryptographic key to decrypt said protected software for executing, the method comprising:

during execution of the protected software, searching for patterns of an intrusion into the protected software;

detecting with a security engine an intrusion by an intruding program into the protected software during the execution of the protected software, wherein the intruding program uses a monitoring component for gaining unauthorized access, the protected software is comprised of bait code that is executed only when the intruding program gains unauthorized access to the protected software, and the security engine detects the intrusion by detecting execution of the bait code;

creating a signal on detection of an attack; and locking the license container by executing an arbitrary command in the protected software with predefined special values.

* * * * *

UNITED STATES PATENT AND TRADEMARK OFFICE
CERTIFICATE OF CORRECTION

PATENT NO.       : 8,490,191 B2
APPLICATION NO.  : 12/306126
DATED            : July 16, 2013
INVENTOR(S)      : Kuegler et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1144 days.

Signed and Sealed this
Eighth Day of September, 2015

Michelle K. Lee
*Director of the United States Patent and Trademark Office*